United States Patent [19] [11] 4,125,807
Steingroever [45] Nov. 14, 1978

[54] MAGNETIC THICKNESS GAUGE HAVING CONVERTIBLE SCALES

[75] Inventor: Erich A. Steingroever, Cologne, Fed. Rep. of Germany

[73] Assignee: Elektro-Physik, Cologne, Fed. Rep. of Germany

[21] Appl. No.: 713,578

[22] Filed: Aug. 30, 1976

[30] Foreign Application Priority Data

Jul. 3, 1976 [DE] Fed. Rep. of Germany ....... 2630099

[51] Int. Cl.$^2$ ............................................. G01R 33/12
[52] U.S. Cl. .................................................. 324/230
[58] Field of Search ........................ 324/34 TK, 34 R; 116/124 A, 129 R, 129 A, 129 F, DIG. 21, DIG. 46

[56] References Cited

U.S. PATENT DOCUMENTS

| 2,528,640 | 11/1950 | Coleman | 324/115 |
| 3,521,160 | 7/1970 | Nix et al. | 324/34 TK |
| 3,638,119 | 1/1972 | Mackenzie | 324/115 |
| 3,716,779 | 2/1973 | Akulov | 324/34 TK |

FOREIGN PATENT DOCUMENTS

| 538,988 | 8/1941 | United Kingdom | 324/34 TK |
| 227,603 | 2/1967 | U.S.S.R. | 324/34 TK |

OTHER PUBLICATIONS

American Instrument Company, Inc., Wash., D.C., Bulletin 2253; Your Coating Thickness, Jan. 1955, (9 pages).

Bennett, R. S., A Review of Methods for Coating--Thickness Determination; Jour. of Scien. Inst., vol. 26, 1949 (pp. 209-215).

Primary Examiner—Robert J. Corcoran
Attorney, Agent, or Firm—George H. Mitchell, Jr.

[57] ABSTRACT

A thickness gauge for measuring the thickness of a layer applied to a ferromagnetic base by measuring the attractive force of a permanent magnet in contact with the applied layer is provided with easily removable, interchangeable scales to permit direct reading of thickness in terms of metric, English or other units, or in accordance with the characteristics of the particular magnet used in the gauge.

8 Claims, 7 Drawing Figures

MAGNETIC THICKNESS GAUGE HAVING CONVERTIBLE SCALES

This invention relates to a magnetic thickness gauge for measuring layers of non-magnetic material, such as paint or laquer, applied to a ferromagnetic base and is an improvement on the thickness gauge disclosed and claimed in U.S. Pat. No. 3,521,160 and German Pat. No. 869,125.

Thickness gauges of this type consist of a small permanent magnet mounted on a balanced lever arm which is rotatably disposed within a closed housing, the housing being placed in contact with the layer to be measured with the permanent magnet in contact therewith. A control element is rotatably mounted on the same axis as that of the balanced lever arm and is connected with that arm by means of a coil spring whereby rotation of the control element increases the force of the coil spring exerted against the arm until a point is reached at which the attractive force of the permanent magnet for the ferromagnetic base is overcome. The control element is also provided with a scale which is graduated in such a way that the force applied to the arm holding the magnet can be read directly in terms of thickness.

In the known thickness gauges of this type, as disclosed in said U.S. and German patents, the scale is disposed on the circular peripheral edge of the control element, only a portion of which projects upwardly out of an opening in the housing so as to be engageable for manual rotation, thus only a small portion of the scale lying on both sides of the reference mark is visible at any given moment.

Aside from the limited visibility of the scale, in the prior thickness gauges, it is necessary to open the housing in order to exchange the control element and its scale for a scale having a different system of markings as, for example, when it is desired to change from metric units to English units. It is also necessary to disassemble the housing simply for the purpose of aligning the zero point on the scale with the index mark.

Therefore, it is an object of the present invention not only to increase the visibility of the measuring scale in thickness gauges of this type as well as the facility with which the scale may be adjusted, but it is also an object of the invention to arrange the scale on a circular disc which is connected with the gauge in such a way that it can easily exhanged for discs having scales marked in terms of other units.

One way in which the problem is solved is by arranging that the scale be carried on a disc which is removably attached to the end of the shaft which carries the control element and which projects from one side of the housing. As a result, instead of the scale being formed as an integral part of the control element contained within the housing, with the scale being disposed on a disc which is attached to the projecting end of a shaft connected with the control element, it is no longer necessary to open the housing for the purpose of changing the scales or for the adjustment of its zero position.

Another object of the present invention is to increase the accuracy of the scale readings by the provision of an adjustable pointer, or index mark, which is disposed adjacent the scale on the interchangeable discs. One manner in which this can be accomplished is to attach the pointer to a ring which is itself mounted on the housing for rotation about its center, the mounting for the ring also containing a stop which limits the rotation of the ring so that by merely rotating the ring in one direction to the limit of its movement a precise position of the zero point for the scale may always be obtained. A still further object of the invention which is particularly advantageous for the measurement of extremely thin layers or coatings or for measurements of layers or coatings applied to bases or substrates having low magnetic saturation, such as iron, is achieved by arranging that the limit of rotation of the ring in one direction will position the pointer, or index mark, at a location which will serve to indicate a reading on the scale which is equivalent to the measurement of a ferromagnetic base having no coating whatsoever applied to it. The ring can be rotatably mounted directly on the housing or else it can be removably carried on a circular flange which projects outwardly from the housing. Furthermore, the ring may also include a transparent cover to protect the disc carrying the scale.

Other objects and advantages will be apparent to those skilled in the art after reading the following specification in connection with the annexed drawings in which.

Figure 1:
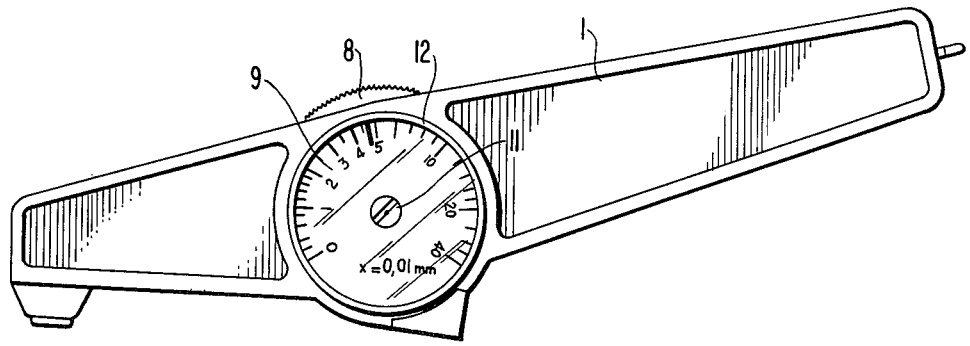
FIG. 1 is a perspective view of a preferred form of magnetic thickness gauge constructed in accordance with the present invention.
Figure 2:
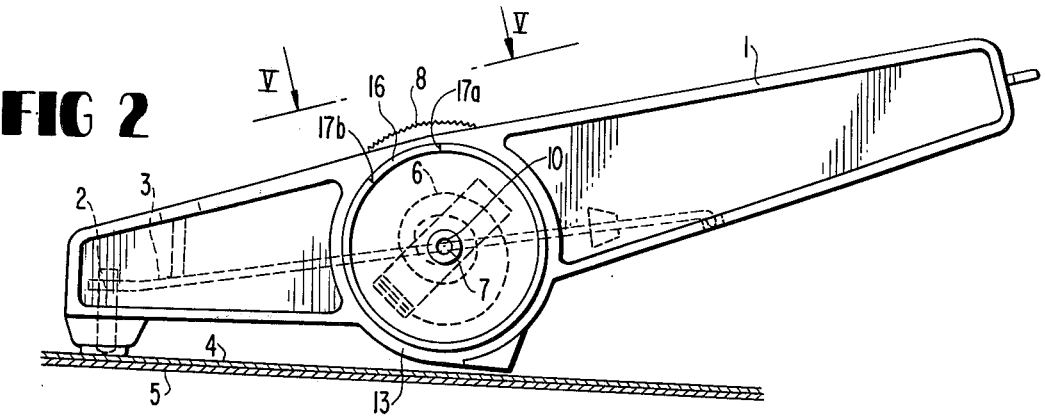
FIG. 2 is a side elevation of the thickness gauge with the interchangeable disc removed and with the housing positioned on an object whose coated layer is to be measured.
Figure 3:
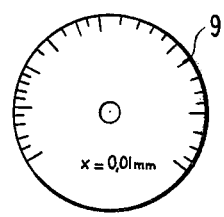
FIG. 3 is a view of a disc provided with a graduated scale.
Figure 4:
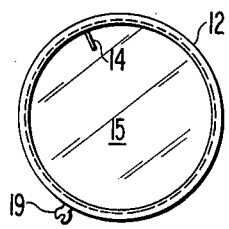
FIG. 4 is a side elevation of a ring carrying a transparent cover and a pointer which cooperates with the graduated disc of FIG. 3.
Figure 7:
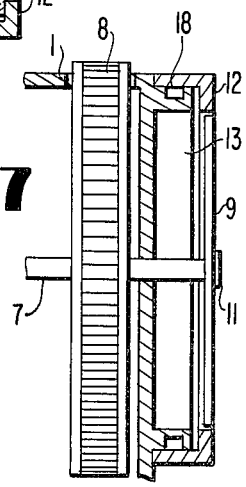
FIG. 7 is a fragmentary cross-section taken on the line VII—VII of FIG. 6.

It can be seen from FIGS. 1 and 2 the magnetic thickness gauge in accordance with the invention comprises an elongated housing 1 within which there is contained a permanent magnet 2 mounted at one end of a balanced lever arm 3 which is freely rotatably mounted for swinging movement about the axis of the shaft 7 whereby the thickness of a non-magnetic layer 4 applied to a ferromagnetic base 5 can be measured as a function of the magnetic attractiveness between the magnet 2 and the base 5. This magnetic attraction can be measured by means of a coil spring 6, one end of which is connected with the balanced lever arm 3 the other end being connected to the control element 8 contained within the housing and fixedly attached to the rotatable shaft 7 with a portion of the periphery of the control element projecting upwardly through an opening in the housing so that the control element can be rotated manually. As can be seen in FIG. 7, the end of shaft 7 projects outwardly from one side of the housing and this end is provided with a threaded bore 10 into which the screw 11 is received to removably fasten the disc 9 which is provided with a peripheral scale which is graduated in terms of thickness of the coating 4. The disc, or dial 9, shown in FIG. 3, is provided with a scale marked in hundreths of a millimeter. Other dials (not shown) are provided which are marked in terms of British units, such as thousandths of an inch, microns, or any variation or special scale desired.

While the embodiment of the gauge shown in the drawings includes a manually operable control element, it is contemplated that the angular force exerted by the spring 6 can be controlled by a small electric motor energized by a battery which could be contained within the housing. In this case, the control element 8 would be wholly contained within the housing and the energization of the electric motor could be controlled by a switch having contacts which open as soon as the magnet 2 moves upwardly.

Surrounding the dial 9 is a ring 12 which is removably mounted on a circular flange 13 which projects outwardly from the side of the housing 1. The ring 12 may be provided with a radially inwardly directed pointer, or index element 14 extending over the face of the scale markings on the dial 9. Alternatively, the ring 12 may also include a transparent cover 15 to protect the dial 9.

Figure 5:
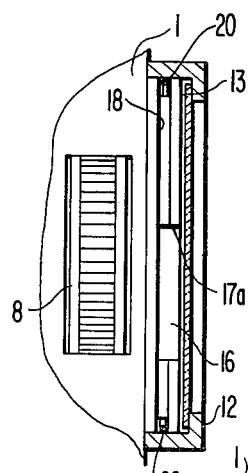
FIG. 5 is a top view taken from the direction of the arrows V—V in FIG. 2 a portion of the housing and rotatable ring being broken away.
Figure 6:
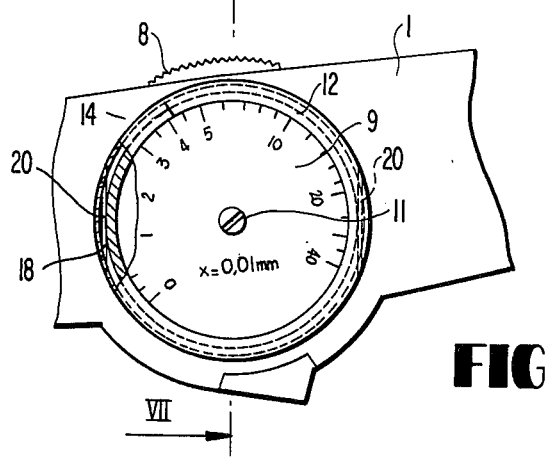
FIG. 6 is a fragmentary view of a modified form of the invention shown in FIGS. 1-5.

A short section of the flange 13 is cut away, as indicated by numeral 16 in FIG. 5 and the pointer 14 can be arranged so that it projects into the arcuate space extending between the open ends of the rings 17a and 17b. In this way, the surfaces 17a and 17b cooperate with the pointer 14 to limit rotary movement of the ring 12 and the location of the end 17a can be located at a point such that when the ring is rotated in a clockwise direction to bring the pointer 14 into engagement therewith, the pointer will mark the correct location for the position on a graduated scale on a dial 9 which corresponds to that obtained when measuring a ferromagnetic support 5 which is completely uncoated. In the case of extremely thin ferromagnetic bases, or in the case of a base having a low magnetic saturation, such as iron, the ring 12 can be shifted angularly to the left to move the pointer 14 to a location which is more appropriate to the material being measured.

One arrangement for removably attaching the ring 12, especially when it includes a transparent cover 15, is to provide it with a threaded set screw 19 which can be tightened radially against the outer periphery of the flange 13 to fix the ring in its adjusted position. Another arrangement is to provide the ring with a pair of chordally extending flexible spring wires 20 for frictional engagement with a groove 18 extending annularly on the outer periphery of the flange 13.

While magnetic thickness gauges of this type are primarily intended for use in the measurement of non-magnetic materials applied to a ferromagnetic support or base it is possible to use the apparatus for the measurement of layers of magnetic material on non-magnetic supports by substituting the appropriate dial having a scale calibrated for such materials, as is well known in the art. This technique is appropriate, especially for the measurement of a layer of nickel.

What is claimed is:

1. In a portable magnetic thickness gauge of the type wherein a housing contains a rotary system which supports a permanent magnet for movement toward and away from a supporting base having a layer applied thereto whose thickness is to be measured, the thickness of said applied layer being a function of the attractive force of said magnet when in contact with the applied layer on the base, said housing also containing a movable control element projecting exteriorly from said housing and spring means connected with the control element to exert force on the magnet to lift it from said surface in response to movement of the control element in one direction, the improvement which includes a rotary shaft in said housing movable with said control element and having one end projecting exteriorly or the housing, indicating means comprising two relatively rotatable elements mounted in concentric relationship respectively on said shaft and on said housing, said two elements also being rotatable with respect to the housing one of said elements having scale markings, the other of said two elements having a reference means cooperating with said scale markings to indicate the values of thickness represented by the movement of the control element to lift the magnet, the element which is provided with said scale markings being removably mounted to permit substitution of another such element provided with different scale markings the mounting for said other named element including means to adjust the initial angular relationship between said two elements.

2. The invention defined in claim 1, wherein a plurality of elements having scale markings are provided, each having different scale markings and means is provided for removably securing each of said elements to said one end of the shaft.

3. The invention defined in claim 1, wherein said reference means includes a pointer and wherein the element having scale markings includes a dial.

4. The invention defined in claim 3, wherein said means to adjust the initial angular relationship includes stop means on said mounting to limit rotation of said pointer in one direction to correspond to an indication on a scale marking of the absence of a layer on a ferromagnetic base.

5. The invention defined in claim 3, wherein said reference means includes ring means mounted on said housing for limited rotation concentric with said shaft, said reference pointer being supported by said ring means.

6. The invention defined in claim 5, wherein said improvement includes a transparent cover supported by said ring means to protect said one element.

7. The invention defined in claim 5, wherein said mounting includes a circular flange having an exterior groove on the housing to removably support said ring means for said limited rotation.

8. The invention defined in claim 7, wherein said ring means includes an elongated spring wire chordally disposed in said ring means for frictional engagement in the groove of said circular flange.

* * * * *